April 14, 1959      P. F. GILBERTY      2,881,714
ICE CREAM LAYER CAKE MACHINE
Filed Oct. 19, 1956      2 Sheets-Sheet 1
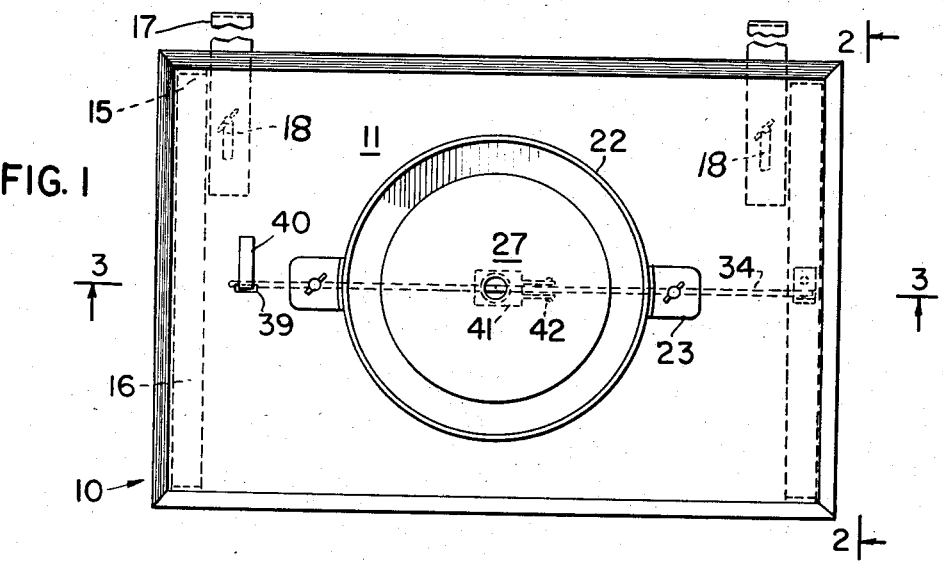
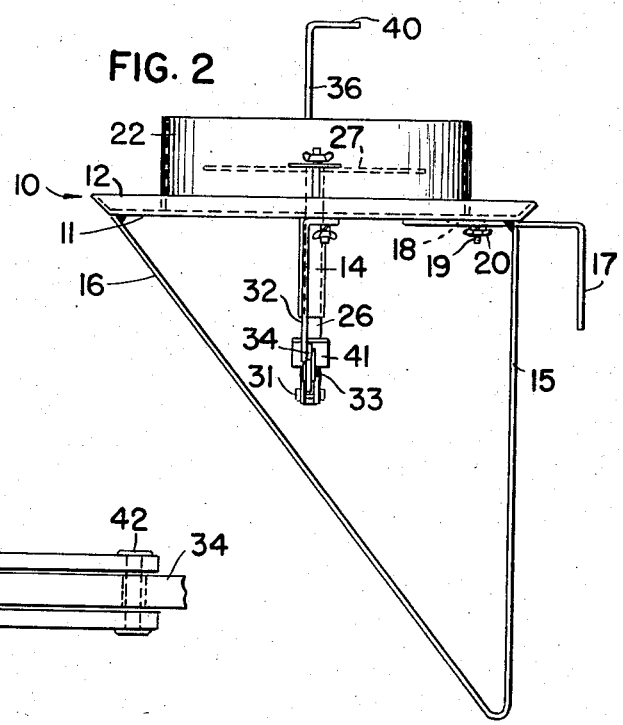
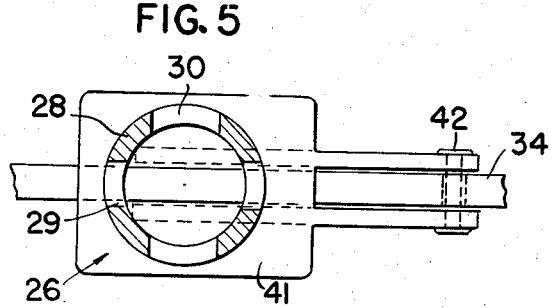
PAUL F. GILBERTY
*INVENTOR.*
BY *Nelson J. Edge*
ATTORNEY April 14, 1959 P. F. GILBERTY 2,881,714
ICE CREAM LAYER CAKE MACHINE
Filed Oct. 19, 1956 2 Sheets-Sheet 2
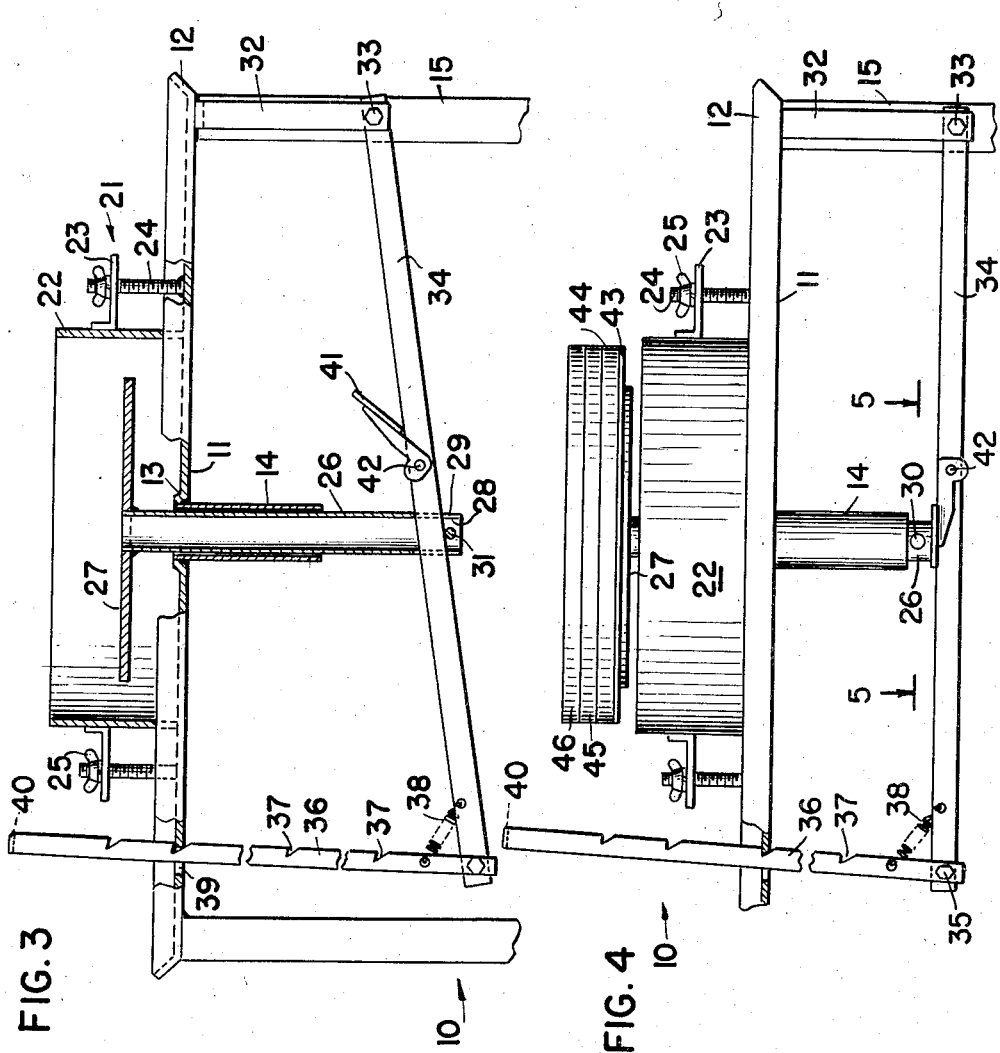
PAUL F. GILBERTY
INVENTOR.
BY Nelson J. Edge
ATTORNEY United States Patent Office 2,881,714
Patented Apr. 14, 1959

2,881,714
ICE CREAM LAYER CAKE MACHINE
Paul F. Gilberty, Roslyn Heights, N.Y.
Application October 19, 1956, Serial No. 616,975
3 Claims. (Cl. 107—1)

The present invention relates to a molding device and refers more particularly to a device for building up a semi solid substance in a plurality of successive uniform layers to form a cake, and then for rotating the cake to facilitate decoration thereof. The exact purpose of the machine as developed is the production of layer cakes of ice cream, however other uses will suggest themselves to those skilled in the art.

An object of the present invention is to provide means whereby a neighborhood ice cream storekeeper may produce ice cream layer cakes to order, rapidly, in sanitary manner and with minimum investment in equipment.

A further object is that the said equipment may by interchanging of detachable parts produce cakes of different shape and with any desired thickness of layers.

Another object is that the equipment shall be as compact as possible, not require any floor space, and be easily stored.

Other objects will appear as the description proceeds.

In accomplishing the objects of the present invention, a portable utensil is provided in the shape of a platform provided with adjustable hooks for engaging the top of an ice cream cabinet, and braces which rest against the side of the cabinet, thus supporting the platform substantially at cabinet top height. A tube extends downwardly from and through the center of the platform, being inserted in an upstanding central lip and being welded thereto. The platform also has an upwardly flared perimeter. A cake mold in any desired shape is located concentrically on the platform, being detachably connected thereto, and consisting of a continuous side wall extending upwardly from the platform. A shaft is slidable and rotatable in the tube, and on the top of the shaft is a plate. A transverse bar extends under the shaft and supports the latter, being connected to a fixed pivot at one side of the device and to an adjusting handle at the opposite side. The adjusting handle extends vertically through a hole in the platform and has notches spaced along its length. Each notch provides a different height of the plate supported on the shaft. A bearing plate is pivotally mounted on the transverse rod.

In operation, the platform is hung on the ice cream cabinet and the plate is set one notch below the top of the mold, and ice cream is spooned onto the plate until the mold is filled. The plate is then lowered a notch and a different flavor of ice cream is filled into the mold, forming a second layer, and this may be repeated until the desired number of layers has been built up. The bearing plate is next moved into operative position and the adjusting handle is raised so that the cake is raised above and out of the mold and may be rotated in order to facilitate decoration.

The invention accordingly consists in the features of construction, combinations of elements and arrangements of parts which will be exemplified in the constructions hereinafter described. In the accompanying drawing, in which is shown one of the various possible illustrative embodiments of this invention:

Figure 1 is a top plan view of the device.
Figure 2 is a side elevation as indicated by the numerals 2—2 of Figure 1.
Figure 3 is a section on the line 3—3 of Figure 1.
Figure 4 is a front elevation, partially in section.
Figure 5 is a section on the line 5—5 of Figure 4.

Referring now in detail to the drawings, the cake making machine 10 comprises the platform 11. The entire device 10 is preferably constructed of stainless steel. Platform 11 is of sheet material and has the upstanding perimetral flange 12 and the substantially central raised lip 13. The tube 14 is inserted in lip 13 and welded thereto, the welded joint further being ground and polished. Tube 14 extends downwardly from platform 11 substantially perpendicularly.

The legs of the device are of metal strip, having a rear branch 15 extending vertically downwardly from platform 11 and a front branch 16 extending rearwardly from the front of platform 11 to merge integrally into rear branch 15. The hooks 17 are substantially L shaped and formed with longitudinal slots 18 by which they are engaged over studs 19 on which they are held by wing nuts 20. Hooks 17 point downwardly.

The cake mold 21 comprises the substantially vertically extending, continuous wall 22 which rests on platform 11 and is held in position by the lugs 23 engaged over studs 24 of platform 11 fastened by wing nuts 25. Wall 22 is concentrically located around tube 14, substantially circumscribing the latter.

Slidably and rotatably mounted in tube 14 is the shaft 26 at the top of which is rigidly connected the plate 27. The lower portion 28 of shaft 26 is bifurcated by the slot 29 and further formed with the pair of opposite holes 30 in which is fitted the pin 31.

The rod 32 extends downwardly from platform 11 and at its lower end bears the pivot pin 33 on which is mounted the transverse rod 34. Rod 34 passes under and through shaft 26, supporting the same and being held in slot 29 thereof by pin 31. Rod 34 bears at its free end pivot pin 35 which connects it to the adjusting rod or handle 36, the latter formed with the notches 37 spaced along its length. An extension coil spring 38 draws the rod 36 to the right of Figures 3 and 4. Rod 36 extends upwardly through slot 39 in platform 11 and terminates in the horizontal grip portion 40.

The bearing pad or plate 41 is mounted by pivot pin 42 on rod 34 and is swingable from the inoperative position of Figures 2 and 3 to the operative position of Figures 1, 4 and 5, in which it directly underlies shaft 26 and constitutes a thrust bearing surface therefor.

In operation, the hooks 17 are engaged over any ledge which may be present on the top of the ice cream cabinet, or one hook 17 may be entered in each of two compartments of the ice cream cabinet. The device 10 will then hang from the top of the cabinet with the branches 15 of the legs against the side of the cabinet, and the platform 11 even in height with the cabinet top.

The front branches 16 thus support the front margin of platform 11, branches 16 being supported by their integral connection with rear branches 15.

A cardboard plate 43 is placed over the plate 27, the plate 43 being of a size and shape to fit inside the wall 22 easily and act as the foundation of the cake. By manipulation of the adjusting handle 36 and engagement of an appropriate notch 37 thereof in the wall of hole 39 of platform 11, the plates 27, 43 may be brought to the desired height, which will be a distance below the top of wall 22 equal to the desired thickness of the bottom layer of the cake. The layer is then filled in by spoon, dipper or other preferred means. When the first layer 44 has been built up even with the top of wall 22, the adjusting handle 36 is lowered one or more notches depending on the depth desired in the next layer. The lowering of handle 36 lowers the shaft 26, plates 27, 43 and the first layer 44 of the cake, leaving an empty space between layer 44 and the top of wall 22. This space is then filled with ice cream or other food substance, producing layer 45, and successive layers as 46 are built up until the cake reaches the desired number of layers and is ready to be decorated.

The completely built but undecorated cake being contained within wall 22 and the shaft 26 being at its low limit of travel, the pin 31 is removed and rods 36 and 34 are dropped further, to permit the bearing plate or pad 41 to be swung into operative position as in Figures 1, 4 and 5. Handle 36 is now raised so that the cake is raised above wall 22, as in Figure 4. One notch 37 will be engaged and spring 38 will preserve such engagement, to preserve the relative position of parts illustrated in Figure 4.

The cake may now be rotated by direct pressure thereon, and decoration may proceed, facilitated by the bringing of all parts of the cake successively to the operator by means of the rotation.

Any ice cream which drips from the cake is held on platform 11 by the perimetral flange 12 and by the raised lip portion 13.

The wall 22 is removable for superior sanitation and also to provide a greater variety of such forms, for instance squares or stars or other shapes, and various depths.

By use of the present device an operator may produce ice cream layer cakes in which the layers are uniform, and the same may be done economically and cheaply.

The device is extremely simple and avoids costly forms of construction. The transverse rod 34 is securely held in the slot 29 by the pin 31, both during normal operation and during storage, whereas rotatability of shaft 26 on plate 41 as a thrust bearing surface is provided when rotation becomes desirable during decoration of the cake.

It will thus be seen that there is provided a device in which the several objects of this invention are achieved, and which is well adapted to meet the conditions of practical use. As various possible embodiments might be made of the above invention, and as various changes might be made in the embodiments above set forth, it is to be understood that all matter herein set forth or shown in the accompanying drawing is to be interpreted as illustrative and not in a limiting sense.

What is claimed is:

1. In a device of the class described, a substantially horizontally extending platform having an upstanding perimetral flange and a substantially central raised lip defining an opening, a tube connected to said platform and extending substantially perpendicularly downwardly therefrom and in communication with said opening, a shaft slidably mounted in said tube, a plate mounted atop said shaft substantially parallel to said platform, a continuous, substantially vertical wall extending upwardly from said platform a substantial distance suitable to define the height of an ice cream layer cake or the like, said wall circumscribing the area occupied by said plate, means for supporting said shaft and plate selectively at any one of a plurality of heights above said platform, hook means extending downwardly from the rear of said platform, rear leg means extending downwardly from the rear of said platform and front leg means connected to said rear leg means and supportingly engaging said platform forwardly of said rear leg means.

2. In a device of the class described, a substantially horizontally extending platform having an upstanding perimetral flange and a substantially central raised lip defining an opening, a tube connected to said platform and extending substantially perpendicularly downwardly therefrom and in communication with said opening, a shaft slidably mounted in said tube, a plate mounted atop said shaft substantially parallel to said platform, a continuous, substantially vertical wall extending upwardly from said platform a substantial distance suitable to define the height of an ice cream layer cake or the like, said wall circumscribing the area occupied by said plate and means for supporting said shaft and plate selectively at any one of a plurality of heights above said platform, said support means including a rod extending downwardly from said platform, a transverse rod pivotally supported from said first rod and passing beneath said shaft and said shaft resting thereon, and an adjusting rod pivotally connected to said transverse rod, said adjusting rod extending upwardly through said platform and being formed with a plurality of notches spaced along its length, each notch being engageable with said platform to support said shaft and plate at a predetermined height.

3. A device according to claim 2, said shaft further being rotatable in said tube, said shaft further having its lower end bifurcated and said transverse rod being engaged in said lower end, said transverse rod further having connected thereto a bearing pad movable from an operative to an inoperative position, and said bearing pad in said operative position being located under said bifurcated lower end of said shaft and constituting a thrust bearing surface therefor.

References Cited in the file of this patent

UNITED STATES PATENTS

| 696,778 | Weglein | Apr. 1, 1902 |
| 1,488,138 | Warner | Mar. 25, 1924 |
| 1,628,828 | Denmead | May 17, 1927 |
| 1,977,309 | Jackson | Oct. 16, 1934 |
| 2,264,202 | Forney | Nov. 25, 1941 |